(12) United States Patent
Shinagawa

(10) Patent No.: US 6,970,784 B2
(45) Date of Patent: Nov. 29, 2005

(54) NAVIGATION ASSISTING APPARATUS, AIRCRAFT IN WHICH THE NAVIGATION ASSISTING SYSTEM IS MOUNTED, NAVIGATION ASSISTING METHOD AND NAVIGATION ASSIST PROCESSING PROGRAM RECORDED IN A STORAGE MEDIUM

(75) Inventor: Yuichi Shinagawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 10/319,509

(22) Filed: Dec. 16, 2002

(65) Prior Publication Data

US 2003/0139876 A1  Jul. 24, 2003

(30) Foreign Application Priority Data

Dec. 20, 2001 (JP) .............................. 2001-388276

(51) Int. Cl.⁷ .................... G01S 13/93; G01C 21/00; G01C 23/00
(52) U.S. Cl. .................... 701/204; 701/120; 340/994
(58) Field of Search .................... 701/121, 120, 701/122, 204, 206, 207, 213, 117, 118, 119; 340/994, 990, 961, 995.23, 988; 342/47

(56) References Cited

U.S. PATENT DOCUMENTS

| | | | | |
|---|---|---|---|---|
| 2,646,924 A | * | 7/1953 | Schuck | 701/204 |
| 4,774,670 A | * | 9/1988 | Palmieri | 701/204 |
| 5,121,325 A | * | 6/1992 | DeJonge | 701/123 |
| 5,365,449 A | * | 11/1994 | Kashiwazaki | 701/208 |
| 5,408,413 A | * | 4/1995 | Gonser et al. | 701/204 |
| 5,724,243 A | * | 3/1998 | Westerlage et al. | 455/456.5 |

* cited by examiner

Primary Examiner—Thomas G. Black
Assistant Examiner—Dalena Tran
(74) Attorney, Agent, or Firm—Oblon, Spivak, McClelland, Maier & Neustadt, P.C.

(57) ABSTRACT

An arithmetic unit calculates an estimated time of arrival (ETA) of an aircraft at a target point, and obtains a difference between ETA and a required time of arrival (RTA) at the target point. It multiplies a time error corresponding to the difference in time by the velocity of the aircraft, thereby converting the time error to a distance error. The distance error is symbol-displayed as $\Delta P_{TIME}$ in a display unit. Thus, the time error concerning a flight of the aircraft is visually displayed as a distance error. If the distance error exceeds a preset threshold value, a caution such as a display message or a voice message is generated.

6 Claims, 4 Drawing Sheets

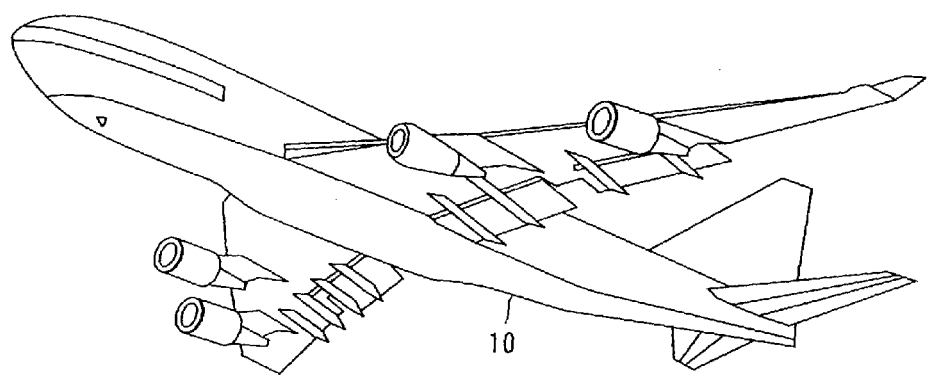
FIG. 1
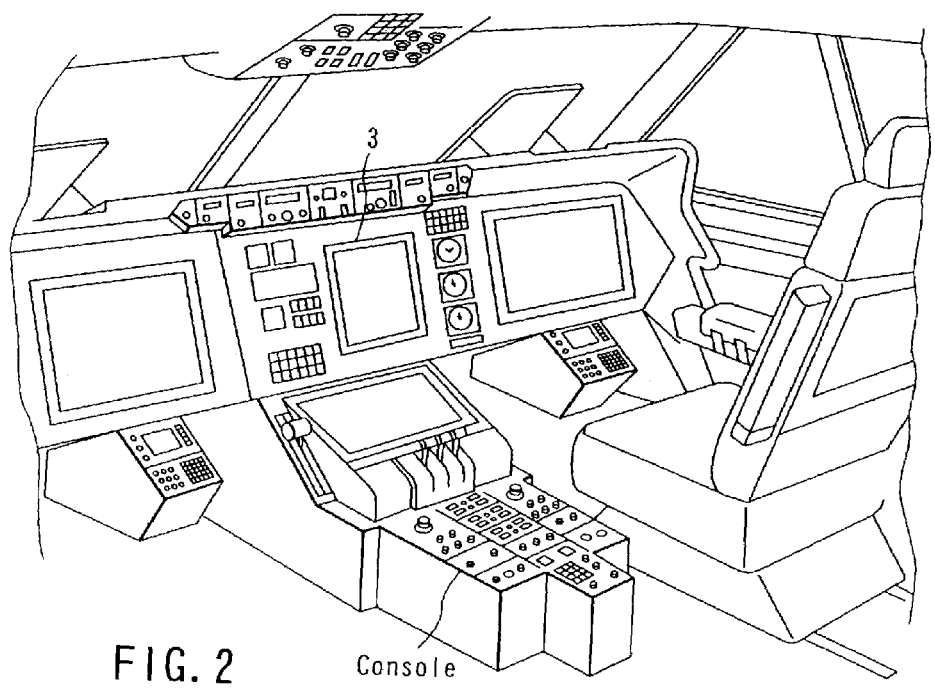
FIG. 2   Console

NAVIGATION ASSISTING APPARATUS, AIRCRAFT IN WHICH THE NAVIGATION ASSISTING SYSTEM IS MOUNTED, NAVIGATION ASSISTING METHOD AND NAVIGATION ASSIST PROCESSING PROGRAM RECORDED IN A STORAGE MEDIUM

CROSS-REFERENCE TO RELATED APPLICATIONS

This application is based upon and claims the benefit of priority from the prior Japanese Patent Application No. 2001-388276, filed Dec. 20, 2001, the entire contents of which are incorporated herein by reference.

BACKGROUND OF THE INVENTION

1. Field of the Invention

The present invention relates to a navigation assisting apparatus to be mounted in an aircraft, an aircraft in which the navigation assisting apparatus is mounted, a navigation assisting method and a navigation assist processing program recorded in a storage medium. In particular, the present invention relates to a four-dimensional navigation method. The four-dimensional navigation method deals with navigation including management on the basis of time in addition to three-dimensional navigation which manages the status of an aircraft on the basis of Latitude, Longitude and altitude.

2. Description of the Related Art

A conventional navigation assisting apparatus is ready for three-dimensional navigation, which manages the status of an aircraft on the basis of Latitude, Longitude and altitude. Three-dimensional navigation manages the positional accuracy of an aircraft and the distance between aircrafts. To manage aircraft navigation accuracy, concepts of RNP (Required Navigation Performance), ANP (Actual Navigation Performance), etc., are used.

An FMC (Flight Management Computer) mounted in an aircraft calculates ANP on the basis of data supplied from a plurality of navigation sensors. The ANP values are monitored by the FMC itself or a pilot using an MCDU (Multifunctional Control Display Unit) so as not to exceed the range defined by RNP.

The altitude of an aircraft is acquired by a GPS receiver, a radio altimeter or a barometric altimeter. Whether the aircraft maintains a target altitude or not is monitored by the pilot or the FMC itself. The position of the aircraft in the along track (the direction in which the aircraft travels) is managed with reference to time such that, for example, an interval of at least two minutes is kept between the aircraft and the preceding one. Thus, according to conventional navigation, the position of an aircraft is managed three-dimensionally.

In recent years, air transportation has been tightly scheduled to meet economic demands in particular. It is certain that CNS/ATM (Communication Navigation Surveillance/Air Traffic Management) will be introduced into air traffic management in future. Introduction of CNS/ATM will further tighten air transportation schedules.

Conventionally, however, flight intervals are managed with a large time margin to assure safety. This is disadvantageous in increasing the efficiency of air transportation.

Under the circumstances, four-dimensional navigation, which includes a time management factor in addition to the factors of three-dimensional navigation, has been proposed as a new concept of air traffic control. Under the proposal, recent FMCs have been equipped with an RTA (Required Time of Arrival) function. If air traffic control comes to include time management, the time margin can be minimized, so that an economical air service can be expected.

Thus, in recent years, it is a social requirement to offer an economical air service while maintaining a high level of safety. Because of these circumstances, the function for controlling time in management of aircraft has been reinforced. An important problem to be solved in air service is to optimally set the flight interval of aircraft along the track by time management.

BRIEF SUMMARY OF THE INVENTION

An object of the present invention is to provide a navigation assisting apparatus, an aircraft in which the navigation assisting apparatus is mounted, a navigation assisting method and a navigation assist processing program recorded in a storage medium, which can realize safe and economical air transportation.

A navigation assisting apparatus mounted in an aircraft according to an aspect of the present invention, comprises:

An error calculator (for example, an arithmetic unit 1) which obtains an estimated time of arrival of the aircraft when the aircraft is estimated to arrive at a target point for which a required time of arrival of the aircraft is set in advance, calculating a time error between the estimated time of arrival and the required time of arrival;

a converter (for example, the arithmetic unit 1) which converts the time error calculated by the error calculator to a distance error based on a velocity of the aircraft; and a display (for example, a display unit 1) which visually displays the distance error obtained by the converter.

Further, the display displays an aircraft symbol representing the aircraft and an error symbol (for example, $\Delta P_{TIME}$) having a length corresponding to the distance error.

With the above means, the difference between the estimated time of arrival at the target point (for example, a waypoint) and the required time of arrival at the point is calculated by the error calculator. The converter calculates the distance error from the aforementioned difference in time and the velocity of the aircraft. The display displays the distance error in the form of an error symbol or the like.

Thus, according to the present invention, the pilot of the aircraft can directly recognize the error in time required to arrive at the target point as a distance error. Therefore, the safety of flight can be assured. In addition, the pilot can keep the distance between the aircraft and the preceding one easily and properly, so that economical air transportation can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing an example of an aircraft 10 in which a navigation assisting apparatus according to the present invention is mounted;

FIG. 2 is a diagram showing an example of an external view of a cockpit of the aircraft 10 shown in FIG. 1;

DETAILED DESCRIPTION OF THE INVENTION

An embodiment of the present invention will now be described in detail with reference to the accompanying drawings.

FIG. 1 is a diagram showing an example of an aircraft 10, in which a navigation assisting apparatus according to the present invention is mounted. The aircraft 10 is equipped with various navigation sensors, such as an INS (inertial navigation system or IRS, inertial reference system), a GPS (Global Positioning System) and a DME (Distance Measuring Equipment), all of which are not shown.

FIG. 2 is a diagram showing an example of an external view of a cockpit of the aircraft 10 shown in FIG. 1. The cockpit has a display unit 3, which visually displays various items of information; a console, which receives information input by a pilot; and an arithmetic unit, which processes various types of information.

Figure 3:
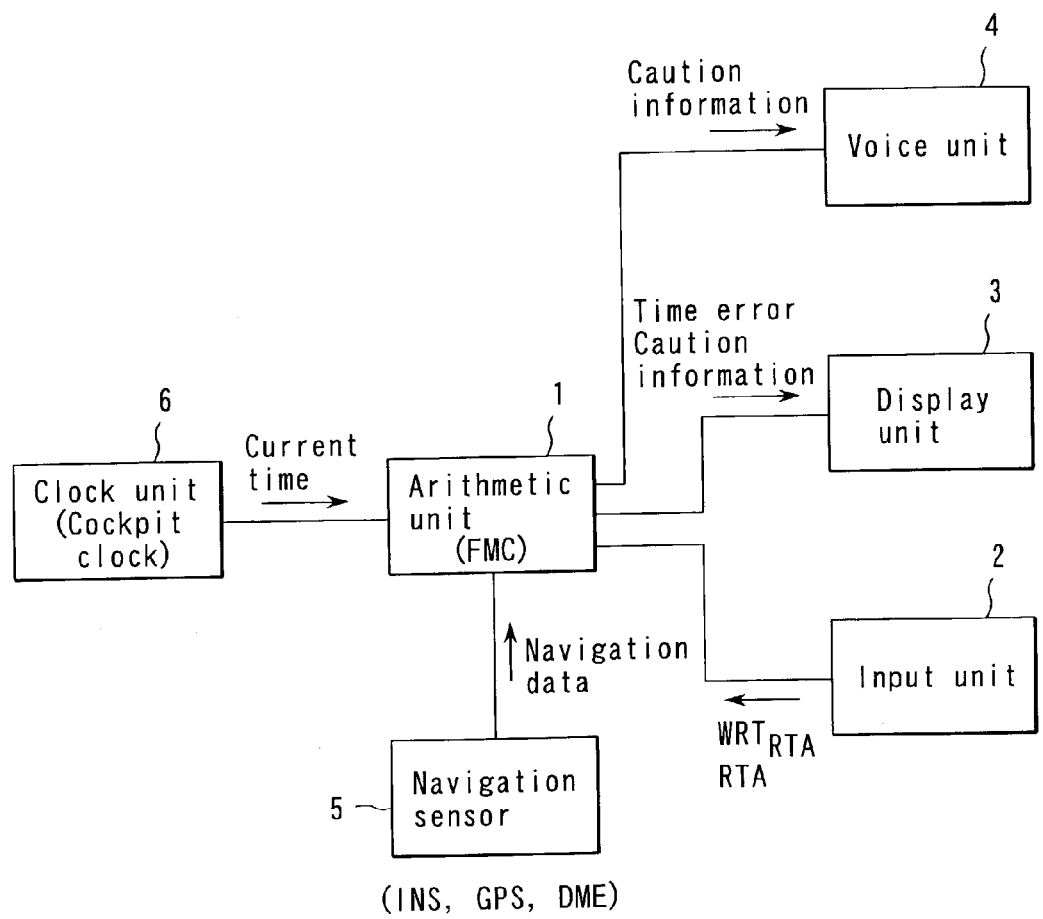
FIG. 3 is a functional block diagram showing the structure of a navigation assisting apparatus according to an embodiment of the present invention.

FIG. 3 is a functional block diagram showing the structure of a navigation assisting apparatus according to this embodiment. This system is mounted in the aircraft 10 and includes an arithmetic unit 1, an input unit 2, the display unit 3, a voice unit 4, a navigation sensor 5 and a clock unit 6.

The arithmetic unit 1 is implemented, for example, as a part of the functions of an FMC. It controls the overall system through operation processes by means of a CPU (Central Processing Unit). The input unit 2, including the console, a keyboard, etc., is used to input various information. The display unit 3 is an LCD (Liquid Crystal Display) or the like. It visually supplies various information to the pilot. The input unit 2 and the display unit 3 are implemented, for example, as parts of the function of an MCDU.

The processing functions of the arithmetic unit 1 are implemented via a program recorded in a recording medium and executed by the CPU of the FMC. The recording medium may be of any type that can store computer programs, for example, a readable semiconductor memory device, a recording medium for a magnetic recording device, and a recording medium for a magneto-optical recording device. More specifically, the recording mediums may be a floppy disk, an optical disk, a magneto-optical disk, a phase change disk, a magnetic tape or the like.

The voice unit 4 generates a caution message when necessary, and calls attention to the pilot. The navigation sensor 5 includes, for example, an INS (Inertia Navigation System), the GPS, the DME, etc., and supplies information for navigation calculation to the arithmetic unit 1. The clock unit 6 supplies a current time to the arithmetic unit 1. The clock unit 6 is mounted in advance in the aircraft 10 as a cockpit clock or a GPS receiver.

Figure 4:
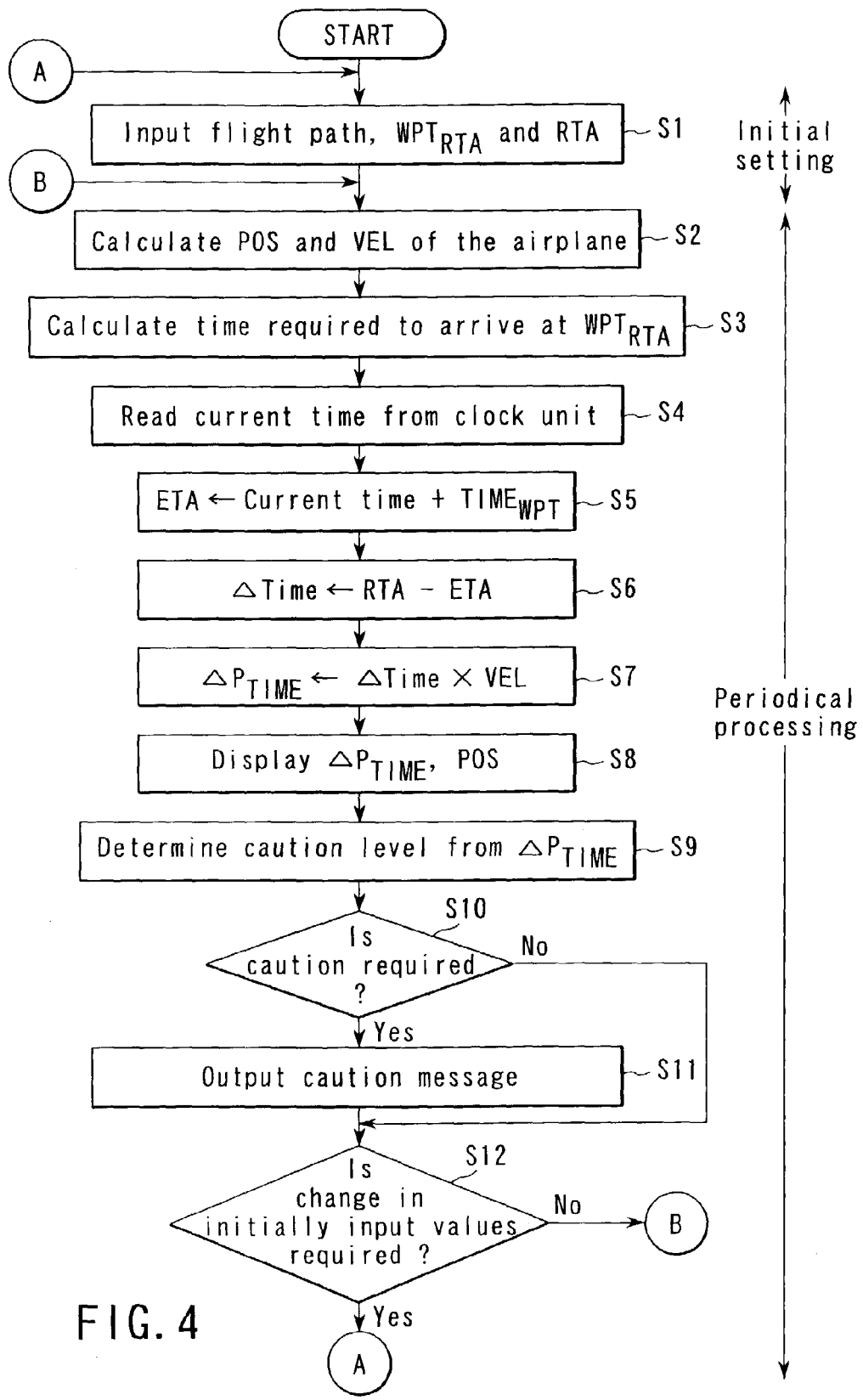
FIG. 4 is a flowchart showing procedures in the navigation assisting apparatus shown in FIG. 3.

FIG. 4 is a flowchart showing procedures in the navigation assisting apparatus having the above structure. In a step S1 in FIG. 4, the pilot inputs information, such as a flight route, a target point to be passed and a required time of arrival (RTA) at the point, through the input unit 2.

In the following descriptions, $WPT_{RTA}$ denotes a target point to be subjected to time management. The arithmetic unit 1 calculates, through a step described below, an estimated time of arrival (ETA) at the target point estimated from the current situations, on the assumption that the aircraft 10 continues the flight based on the flight plan. The arithmetic unit 1 manages the flight of the aircraft 10 from an aspect of time based on the time difference between the ETA and the RTA.

In a step S2, the arithmetic unit 1 calculates navigation data, such as a position (POS) and a velocity (VEL) of the aircraft 10, based on the data supplied from the navigation sensor 5. In a step S3, the arithmetic unit 1 calculates a time required to arrive at the $WPT_{RTA}$ ($TIME_{WPT}$) based on the flight route input in the step S1 and the current velocity of the aircraft 10 obtained in the step S2. In a step S4, the arithmetic unit 1 obtains the current time from the clock unit 6. In a step 5, the arithmetic unit 1 calculates an ETA (an estimated time of arrival at the $WPT_{RTA}$) through the following equation (1) by adding the $TIME_{WPT}$ to the current time.

$$ETA = \text{Current time} + TIME_{WPT} \quad (1)$$

Figure 5:
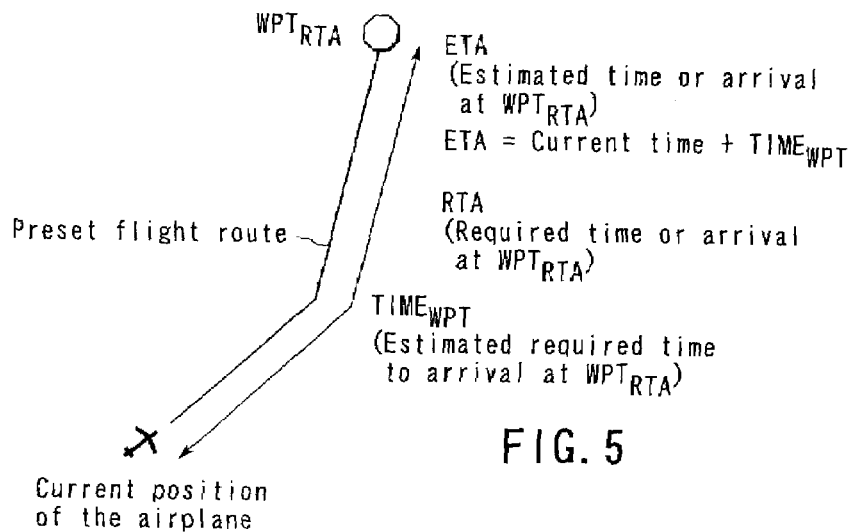
FIG. 5 is a schematic diagram showing the relationship among $WPT_{RTA}$, ETA, RTA and $TIME_{WPT}$.

FIG. 5 is a schematic diagram showing the relationship among $WPT_{RTA}$, ETA, RTA and $TIME_{WPT}$. The $TIME_{WPT}$ is defined along the flight route set in the step S1.

In a step S6 in the flowchart shown in FIG. 4, an error in time of arrival ΔTime at the $WPT_{RTA}$ is calculated on the basis of the following equation (2).

$$\Delta Time = RTA - ETA \quad (2)$$

In a step S7, the error in time of arrival ΔTime calculated in the step S6 is converted to a positional error $\Delta P_{TIME}$ through the following equation (3).

$$\Delta P_{TIME} = \Delta Time \times VEL \quad (3)$$

In a step S8, the display unit 3 displays the positional error $\Delta P_{TIME}$ calculated in the step S7 along with the current position (POS) of the aircraft 10.

Figure 6:
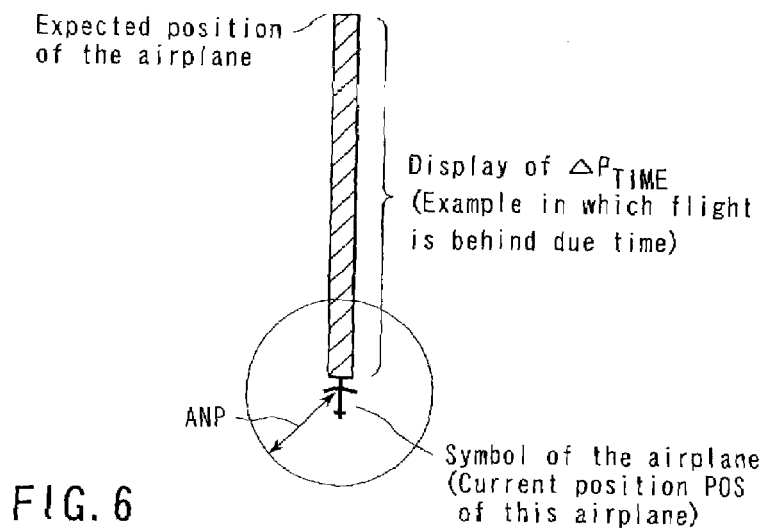
FIG. 6 is a diagram showing an example of an image displayed in a display unit 3 shown in FIGS. 2 and 3.

FIG. 6 shows an example of an image displayed in the display unit 3. In FIG. 6, the hatching portion corresponds to the positional error $\Delta P_{TIME}$. If the aircraft 10 is making a flight behind an appointed time at which the aircraft is to arrive at an expected position, the positional error $\Delta P_{TIME}$ is displayed ahead of an aircraft symbol in the direction of travel, as shown in FIG. 6. On the other hand, if the aircraft 10 is making a flight ahead of the appointed time, the positional error $\Delta P_{TIME}$ is displayed behind the aircraft symbol.

In a step S9 in the flowchart shown in FIG. 4, the arithmetic unit 1 compares the positional error $\Delta P_{TIME}$ with a preset threshold value. If the positional error $\Delta P_{TIME}$ exceeds the threshold value, the arithmetic unit 1 determines a caution level. In a step S10, the arithmetic unit 1 determines whether to generate a caution based on the result of determination in the step S9.

If it is determined in the step S10 that a caution must be output, the voice unit 4 outputs caution information by a voice message in a step S11. Alternatively, the display unit 3 displays caution information. At this time, the output form of the voice message (the tone of the voice or the contents of the read message) and the pattern of the displayed caution information (CAUTION, ALERT, etc.) are varied in accordance with the caution level.

In a step S12, the pilot determines whether a change in initially input values is required or not. If a change is not required, the procedures return to the step S2. If a change is required, the procedures are restarted from the step S1.

The procedures are executed by software by means of the CPU (not shown) of the arithmetic unit 1 based on a control program loaded in, for example, a RAM (Random Access Memory). The procedures of the steps S1 to S4 are generally carried out by the conventional FMC. The procedure of the step S1 is executed in initial setting, whereas the procedures of the steps 2 to 12 are periodically executed in real time.

According to this embodiment, the arithmetic unit 1 calculates an estimated time of arrival (ETA) at a target point, and obtains a difference between the ETA and a required time of arrival (RTA). The time error corresponding to the difference in time is multiplied by the velocity of the aircraft, thereby converting the time error to an error in distance. The error in distance is symbol-displayed as $\Delta P_{TIME}$ on the display unit 3. As a result, the time error relating to flight of an aircraft is visually displayed as a positional error. If the positional error exceeds a predetermined threshold value, a caution, such as a display message or a voice message, is given. The level of the caution can be changed stepwise in accordance with the extent of the error.

Thus, the pilot can recognize an error in time as an error in distance at a glance. In other words, the pilot can be notified of the time error as a positional error in the horizontal direction. As a result, the flight maintaining a proper distance between aircraft in the along track (the direction of travel) is assisted. Consequently, the safety of flight is improved.

In addition, according to this embodiment, the flight intervals of aircraft can be reliably managed by the side of aircraft. Therefore, the time margin of flight intervals can be reduced, thereby shortening the distance between the aircraft. Consequently, the economy of the air transportation can be greater.

Moreover, in this embodiment, an error in time of arrival at a desired point is converted to a positional error especially based on the function of ETA of the flight management functions of the conventional FMC. Therefore, the structure to be added to the conventional system can be minimum, result in a high degree of cost effectiveness.

According to the conventional flight management system, it is necessary to change time margin in accordance with the type of an aircraft. In contrast, according to this embodiment, since a time error is converted to a positional error, aircraft of different velocities can be managed collectively. Therefore, all types of aircraft, from low-velocity aircraft, such as helicopters, to supersonic transport, can be managed on the basis of the same reference.

Consequently, economical air transportation can be realized, while safety is maintained.

The present invention is not limited to the above embodiment. For example, the pattern of the positional error $\Delta P_{TIME}$ displayed in the display unit 3 is not necessarily straight. In other words, if the preset flight route is curved as shown in FIG. 5, the positional error $\Delta P_{TIME}$ may be displayed as a curve along the flight route.

In the flight service of aircraft, RNP is set as an index of required accuracy of a positional error, then ANP is calculated as an estimated error. The threshold to determine whether to output a caution can be varied in accordance with an ANP value.

Additional modifications can be made within the scope of the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A navigation assisting apparatus mounted in an aircraft, comprising:
   an error calculator configured to obtain an estimated time of arrival of the aircraft when the aircraft is estimated to arrive at a target point for which a required time of arrival of the aircraft is set in advance and calculate a time error between the estimated time of arrival and the required time of arrival;
   a converter which converts the time error calculated by the error calculator to a distance error based on a velocity of the aircraft; and
   a display which visually displays the distance error obtained by the converter, an aircraft symbol representing the aircraft, and an error symbol having a length corresponding to the distance error.

2. The navigation assisting apparatus according to claim 1, wherein the display displays the error symbol one of ahead and behind the aircraft symbol in a direction of travel of the aircraft in accordance with a sign of the time error calculated by the error calculator.

3. The navigation assisting apparatus according to claim 1, wherein the display displays the error symbol along a preset flight route of the aircraft.

4. A navigation assisting apparatus mounted in an aircraft, comprising:
   an error calculator configured to obtain an estimated time of arrival of the aircraft when the aircraft is estimated to arrive at a target point for which a required time of arrival of the aircraft is set in advance and calculate a time error between the estimated time of arrival and the required time of arrival;
   a converter configured to convert the time error calculated by the error calculator to a distance error based on a velocity of the aircraft;
   a display configured to visually display the distance error obtained by the converter; and
   a caution generator configured to generate a caution if the distance error obtained by the converter exceeds a threshold value,
   wherein the caution generator varies a level of the caution stepwise in accordance with a difference between the distance error and the threshold value.

5. A navigation assisting apparatus mounted in an aircraft, comprising:
   an error calculator configured to obtain an estimated time of arrival of the aircraft when the aircraft is estimated to arrive at a target point for which a required time of arrival of the aircraft is set in advance and calculate a time error between the estimated time of arrival and the required time of arrival;
   a converter configured to convert the time error calculated by the error calculator to a distance error based on a velocity of the aircraft;

a display configured to visually display the distance error obtained by the converter; and a caution generator configured to generate a caution if the distance error obtained by the converter exceeds a threshold value, wherein the caution generator varies the threshold value in accordance with an accuracy of the distance error.

6. A navigation assisting method for use in an aircraft, comprising:

obtaining an estimated time of arrival of the aircraft when the aircraft is estimated to arrive at a target point for which a required time of arrival of the aircraft is set in advance;

calculating a time error between the estimated time of arrival and the required time of arrival;

converting the time error to a distance error based on a velocity of the aircraft;

visually displaying the distance error;

generating a caution if the distance error exceeds a threshold value; and varying a level of the caution stepwise in accordance with a difference between the distance error and the threshold value.

* * * * *